(12) United States Patent
Jachman et al.

(10) Patent No.: US 9,383,201 B2
(45) Date of Patent: Jul. 5, 2016

(54) OPTOELECTRIC SENSOR AND METHOD FOR THE DETECTION AND DISTANCE DETERMINATION OF OBJECTS

(71) Applicant: SICK AG, Waldkirch (DE)

(72) Inventors: Fabian Jachman, Waldkirch (DE); Simon Franzreb, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/308,984

(22) Filed: Jun. 19, 2014

(65) Prior Publication Data

US 2015/0015868 A1    Jan. 15, 2015

(30) Foreign Application Priority Data

Jul. 11, 2013    (EP) .................................... 13176077

(51) Int. Cl.
| | |
|---|---|
| *G01C 3/08* | (2006.01) |
| *G01S 17/10* | (2006.01) |
| *G01S 17/42* | (2006.01) |
| *G01S 17/89* | (2006.01) |
| *G01S 7/486* | (2006.01) |

(52) U.S. Cl.
CPC . *G01C 3/08* (2013.01); *G01S 7/486* (2013.01); *G01S 17/10* (2013.01); *G01S 17/42* (2013.01); *G01S 17/89* (2013.01)

(58) Field of Classification Search
CPC ....... G01S 7/4817; G01S 17/42; G01S 7/483; G01S 7/487; G01C 3/08
USPC ................................................ 356/3.01–5.15
See application file for complete search history.

(56) References Cited

U.S. PATENT DOCUMENTS

| | | | | |
|---|---|---|---|---|
| 2007/0279615 | A1* | 12/2007 | Degnan ................... | G01S 7/499 356/4.01 |
| 2012/0154786 | A1* | 6/2012 | Gosch et al. ............. | 356/5.01 |
| 2013/0003041 | A1* | 1/2013 | Sigmund ................. | G01S 7/487 356/5.01 |

FOREIGN PATENT DOCUMENTS

| | | |
|---|---|---|
| DE | 4340756 A1 | 6/1994 |
| DE | 102010061382 A1 | 6/2012 |
| EP | 1972961 A2 | 9/2008 |

(Continued)

OTHER PUBLICATIONS

European Search Report dated Mar. 4, 2014 of corresponding EP application No. 13176077.9.

*Primary Examiner* — Luke Ratcliffe
(74) *Attorney, Agent, or Firm* — Nath, Goldberg & Meyer; Jerald L. Meyer (57) ABSTRACT

An optoelectronic sensor (10) for distance determination comprises a transmitter (12) for transmitting a light beam (14) having a plurality of consecutive individual light pulses, a rotatable deflection unit (16) for deflecting the light beam (14), an angle measuring unit (28) for determining an angular position of the deflection unit (16), a light receiver (24) for generating reception pulses from remitted transmission light, a plurality of histogram memories (34) each associated with an angular position, and an evaluation unit (30) which is configured to accumulate time histograms in the histogram memories (34) across several periods of the rotational movement of the deflection unit (16) from reception pulses which are each detected at the angular position associated with the respective histogram memory (34), and to determine, from the histograms of the associated histogram memory (34), an object distance for an angular position.

17 Claims, 3 Drawing Sheets

(56) References Cited

FOREIGN PATENT DOCUMENTS

| | | | |
|---|---|---|---|
| EP | 2182378 | A1 | 5/2010 |
| EP | 2469296 | A1 | 6/2012 |
| EP | 2541273 | A1 | 1/2013 |
| EP | 2589980 | A1 | 5/2013 |
| WO | 2012084298 | A1 | 6/2012 |

\* cited by examiner

OPTOELECTRIC SENSOR AND METHOD FOR THE DETECTION AND DISTANCE DETERMINATION OF OBJECTS

The invention relates to an optoelectronic sensor, in particular a laser scanner, and a method for the detection and distance determination of objects in accordance with the preamble of claim 1 or 12, respectively.

For object detection by a laser scanner, a light beam generated by a laser light source periodically covers a monitoring area by means of a deflection unit. The light is remitted from objects in the monitoring zone and evaluated in the laser scanner. The angular position of the object is detected from the angular position of the deflection, and in addition the distance of the object from the laser scanner is detected from the light time of flight using the speed of light. Two general principles are known to determine the light time of flight. In a phase-based method, the transmission light is modulated, and the phase shift of the received light with respect to the transmitted light is evaluated. In a pulse-based method, the laser scanner measures the time of flight until a transmitted light pulse is received.

With the angle and distance values, the position of an object in the monitoring area is detected in two-dimensional polar coordinates. The third spatial coordinate can likewise be detected by a relative movement in the transverse direction, for example by a further movement degree of freedom of the deflection unit in the laser scanner or by moving the object relative to the laser scanner. Thus, three-dimensional contours can also be measured.

In addition to these measurement applications, laser scanners are also used in safety technology for the monitoring of a source of danger like a dangerous machine. Such a safety laser scanner is known from DE 43 40 756 A1. A protection zone is monitored which must not be entered by operating personal during the operation of the machine. If the laser scanner detects an inadmissible intrusion into the protection zone, such as a leg of an operating person, it initiates an emergency stop of the machine. Other intrusions into the protection zone, such as by static machine parts, can be taught as permitted in advance. Warning fields are often arranged in front of the protection zones, where intrusions initially only lead to a warning in order to prevent the intrusion in the protection zone and thus the securing in advance, and so to increase the availability of the machine. Safety laser scanners typically work on a pulse basis.

Sensors used in the safety technology need to work particularly reliable and for this reason satisfy high safety demands, for example, the standard EN13849 for machine safety and the device standard EN61496 for contactless acting protective devices. For satisfying these safety standards, a series of measures have to be taken, such as safe electronic evaluation by redundant, diverse electronics, functional monitoring or specific monitoring of the contamination of optical components, in particular a front screen, and/or the provision of individual test targets with defined degrees of reflection which have to be recognized at the corresponding scanning angles.

In case that laser scanners are to be used in rough environments, in particular outdoors, an impaired view for example due to rain, snow, fog, or dust has to be expected. The resulting reduction in visual range decreases the energy range of the laser scanner by scattering losses and thus attenuates the optical measurement signal. Depending on the approach of the evaluation, even erroneous measurements due to blinding by the signal caused by the scattering may occur. The actual target object is no longer detected, which may even lead to a safety-critical non-detection of a violation of a protection zone, or the signal caused by the scattering is misinterpreted as an object. In dependence on nature and extent of the scattering, the range is reduced, the sensor is unreliable, or a measurement is prevented and the sensor thus no longer available.

The distinction between impaired view and objects is unreliable in simple evaluation methods comparing the reception signal and an object threshold, because an impaired view in a near range easily equals the intensity of a more distant object. Counter measures like the distance-dependent adjustment of the threshold are not sufficient to exclude mistakes.

Another class of laser scanners also known as multiple echo resolving do not evaluate the reception signal with a threshold, but consider the entire time dependent echo curve following a transmission pulse. To this end, the reception signal is sampled in an A/D converter, and the stored, complete curve subsequently evaluated with a pattern recognition method. This approach is for example pursued in EP 2 182 378 A1. The method at least requires high hardware costs and also does not solve all problems associated with impaired view.

In addition to the pulse-based and phase-based light time of flight methods as already mentioned, so-called pulse averaging methods are also known. A respective laser scanner according to EP 2 469 296 A1 transmits a plurality of individual pulses and accumulates the resulting reception pulses in a histogram which is subsequently statistically evaluated for determining a reception point in time. The scanning beam covers a certain angular range during the time interval in which the histogram is accumulated, so that the resulting measurement value is a local average. Due to the averaging, a very high signal-to-noise ratio is achieved. The time interval typically is very short, for example in the range of some tens of microseconds, so that a particle impairing the view like a rain drop does not significantly move and can be considered as static. Accordingly, the rain drop is either detected as an object, or its remission obscures an object behind it. In both cases, the laser scanner does not measure correctly.

In a similar laser scanner according to WO 2012 084 298 A1 additional histogram memories are provided so that reception pulses contribute to histograms in an overlapping manner and can be evaluated in parallel. However, this measure does not increase the robustness against impaired view.

A laser scanner according to EP 2 541 273 A1 additionally uses a splitter element in the analog reception path in order to divide the reception signal in a higher frequency object signal and a lower frequency view impairment signal, with both signals being evaluated separately. Although this significantly improves the evaluation, measurement of an object covered by a rain drop is missing from the very beginning, so that regardless of the quality of evaluation a measurement error results.

It is therefore an object of the invention to improve the measurement performance of a sensor of the pulse averaging method type in case of impaired view.

This object is satisfied by an optoelectronic sensor, in particular a laser scanner, for the detection and distance determination of objects in a monitoring area, the sensor comprising:

a light transmitter for transmitting a transmission light beam having a plurality of consecutive individual light pulses;
  a rotatable deflection unit for a periodic deflection of the transmission light beam in the monitoring area;
  an angle measuring unit for determining an angular position of the deflection unit;

a light receiver for generating reception pulses from transmission light remitted or reflected by objects in the monitoring area;

at least one histogram memory; and an evaluation unit which is configured to accumulate a time histogram from a plurality of reception pulses in the histogram memory and to determine, from the histogram, a light time of flight from the sensor to an object and therefrom an object distance, wherein a plurality of histogram memories is provided each associated with an angular position, and wherein the evaluation unit is configured to accumulate time histograms in the histogram memories across several periods of the rotational movement of the deflection unit from reception pulses which are each detected at the angular position associated with the respective histogram memory, and to determine the object distance for an angular position from the histogram of the associated histogram memory.

The invention starts from the basic idea to accumulate histograms across several periods rather than one period. To that end, a plurality of histogram memories is provided for different angular positions to be resolved. This is to be understood in a functional meaning, i.e. physically histogram memories may form one larger shared memory block. In contrast to the prior art, histograms are not continuously accumulated from directly successive reception pulses, but only bit by bit and intermittently across or over several periods. Once a histogram has been accumulated after several periods, a light time of flight is determined from that histogram. From corresponding object distances at the various angular positions associated with the histograms, a distance contour of the objects in the monitoring area arises as in a common laser scanner. Here, a period typically corresponds to one revolution of the deflection unit, but it could also be only a fraction of a revolution, such as in case the deflection unit includes a polygon mirror, where the monitored angular segment is scanned multiple times per revolution.

The invention has the advantage that obstacles like rain drops which obscure the view are averaged out, so that a measurement is possible in spite of the impaired view. One reason is that an obstacle obscuring the view usually does not remain at the same position across several periods, so that some histogram values are affected at most. Hence, the known pulse averaging method is advantageously modified by a change in the assignment of individual reception pulses to measurement values and thus a change in the statistical basis, so that the signal-to-noise ratio for an impaired view can be improved with nearly no additional costs. The sensor can be used even in rough conditions, such as in dusty environments or in outdoor areas.

The evaluation unit is preferably configured to add one and only one reception pulse to the histograms per period of the rotational movement of the deflection unit. Thus, there is a direct correspondence of repetition frequency of the individual pulses and the angular resolution of the sensor. The monitoring area is divided into angular positions to be resolved, each being associated with both a respective histogram memory and a respective transmitted individual light pulse. Therefore, the histograms grow by one value during each period, and each value is specifically assigned with a fixed angular position. Hence, each measurement value is an average over time, but not over the angle.

In an alternative embodiment, the evaluation unit is preferably configured to add several consecutive reception pulses to the histograms per period of the rotational movement of the deflection unit. This results in an averaging also depending on the angle.

Here, the reception pulses may selectively only be registered in one histogram memory. Then, fewer histogram memories are required, namely, by a factor corresponding to the number of successive reception pulses being added during one period. At the same time, the angular resolution decreases by this factor in comparison with an embodiment where a separate histogram memory is provided for each angular position where an individual light pulse is transmitted. Since the histograms are filled faster, the reaction time is improved by the same factor.

The angular resolution can also be preserved by configuring the evaluation unit, in another alternative embodiment, to add a reception pulse to several histograms in histogram memories associated with adjacent angular positions. In this case, histograms are formed in an overlapping manner, and each reception pulse contributes to multiple histograms in an angular neighborhood within the overlap. There remain some redundancy in the measurement value basis and still an angle dependent averaging, but it can be achieved that a distance value is determined for each direction into which an individual pulse is transmitted after significantly fewer periods.

The evaluation unit is preferably configured to divide the histogram memories into a plurality of groups and to evaluate the histograms accumulated in the histogram memories in a staggered manner over a corresponding number of periods of the rotational movement of the deflection unit by determining the light time of flight from histograms of histogram memories of one group in one period. Without a staggered evaluation, there are phases of several periods during which histograms are merely accumulated. However, during that period where the histograms are completed, the light times of flight need to be determined very quickly so that new histograms may be formed in the subsequent period. This bottleneck could be prevented by buffer memories, and in some embodiments yet to be described histograms are accumulated and evaluated in a sliding manner, so that a staggered evaluation is not always useful. However, where a staggered evaluation is possible, it supports better use of existing evaluation capacity, with the result that less powerful and thus less expensive components can be used.

The deflection unit preferably has a rotational speed of at least 10,000 revolutions per minute. This is a much higher rotational speed than what currently is used in laser scanners, and it at least partially compensates the increase in response time caused by forming histograms across several periods. High rotational speeds are particularly advantageous in embodiments where histograms are only slowly accumulated, such as by only one reception pulse per period. In other embodiments, where several reception pulses contribute to a histogram per period, the increase in response time is less severe from the beginning, so that slower rotational speeds of 5,000 revoluations per minute or less are sufficient. Any arbitrary rotational speed is of cause possible, independent of the way in which the histograms are accumulated, if the impact on response time is accepted.

The histogram memories are preferably FIFO memories so that when the most recent reception pulse is added the oldest reception pulse is deleted. This is only possible if the histogram values are not directly accumulated, but it remains distinguishable which contribution is associated with what reception pulse. After an initial transient phase, completely accumulated histograms are available in each period. Similar to a sliding average, histograms in successive periods are not independent. Two histograms become independent only after several periods, when in dependence on the depth of the histogram and the number of reception pulses considered per period all the old reception pulses have been replaced by fresh reception pulses.

The evaluation unit is preferably configured to periodically let the values in the histogram memories fade and to increase the values for a new reception pulse to be added. That is, the reception pulses contributing to a histogram have kind of a decay time, for example with a time constant of an exponential decay. Then, reception pulses contribute with a larger weight the shorter they date back, with the currently added reception pulse having the largest weight. Similar to the embodiment having a FIFO memory, updated histograms are available in each period after an initial transient phase. By adjusting the time constant of the decay the averaging time window of the histograms is determined.

The evaluation unit is preferably configured to determine a light time of flight from the histograms with an evaluation period shorter than the period required to accumulate a complete histogram, in particular to determine a light time of flight once per period. Thus, the constantly updated histograms are used to freshly determine measurement values with a shorter response time. As explained above, these measurement values are independent only at intervals of several periods, after a number of reception pulses corresponding to the length of the histogram has been detected in the relevant angular region or after older reception pulses are negligible due to decay, respectively. Nevertheless, each measurement value represents the correct, current measurement situation.

The reception pulses are preferably accumulated in the histograms following a binarization. The amplitude of the reception pulses is thus represented by only 1 bit. Therefore, memory cells of the histogram memories can be small, because for example 1 byte is sufficient to accumulate 255 reception pulses. The binarization preferably is done by driving the reception pulse into saturation in a limiting amplifier and a subsequent 1-bit-sampling in a comparator.

The evaluation unit is preferably configured to compare the object distances determined in dependence on angular positions with predefined protection zones in order to detect an object intrusion into a protection zone and to then output a safety-related shutdown signal. The object contours are determined in two dimensions by the time of flight measurements. Correspondingly, protection zones can be configured in advance, or dynamically adjusted or even generated, and be compared with the object contours. A sensor which evaluates protection zones for potential safety-related shutdowns preferably is a safe sensor according to the standards cited in the introduction or similar relevant standards in its entirety. Then, for example, a safe output (OSSD, Output Signal Switching Device) is provided where the shutdown signal is output.

The object is also satisfied by a method for the detection and distance determination of objects in a monitoring area, wherein a transmission light beam having a plurality of consecutive individual light pulses is transmitted and periodically scans the monitoring area by means of a rotatable deflection unit whose respective angular position is measured, reception pulses are generated from transmission light remitted or reflected by objects in the monitoring area, a time histogram is accumulated from a plurality of reception pulses in at least one histogram memory, and a light time of flight to an object and therefrom an object distance is determined, wherein time histograms are accumulated in a plurality of histogram memories each associated with an angular position, time histograms are accumulated in the histogram memories across several periods of the rotational movement of the deflection unit from reception pulses which are each detected at the angular position associated with the respective histogram memory, and the object distance for an angular position is determined from the histogram of the associated histogram memory.

In a preferred embodiment of the method, several consecutive reception pulses are added to a histogram. As an alternative, the histograms are accumulated and evaluated in a moving window. The object distances determined in dependence on angular positions are preferably compared with predefined protection zones in order to detect an object intrusion into a protection zone and in that case a safety-related shutdown signal is output.

The inventive method can be modified in a similar manner and shows similar advantages. Such advantageous features are described in the sub claims following the independent claims in an exemplary, but non-limiting manner.

The invention will be explained in the following also with respect to further advantages and features with reference to exemplary embodiments and the enclosed drawing. The Figures of the drawing show in.

Figure 1:
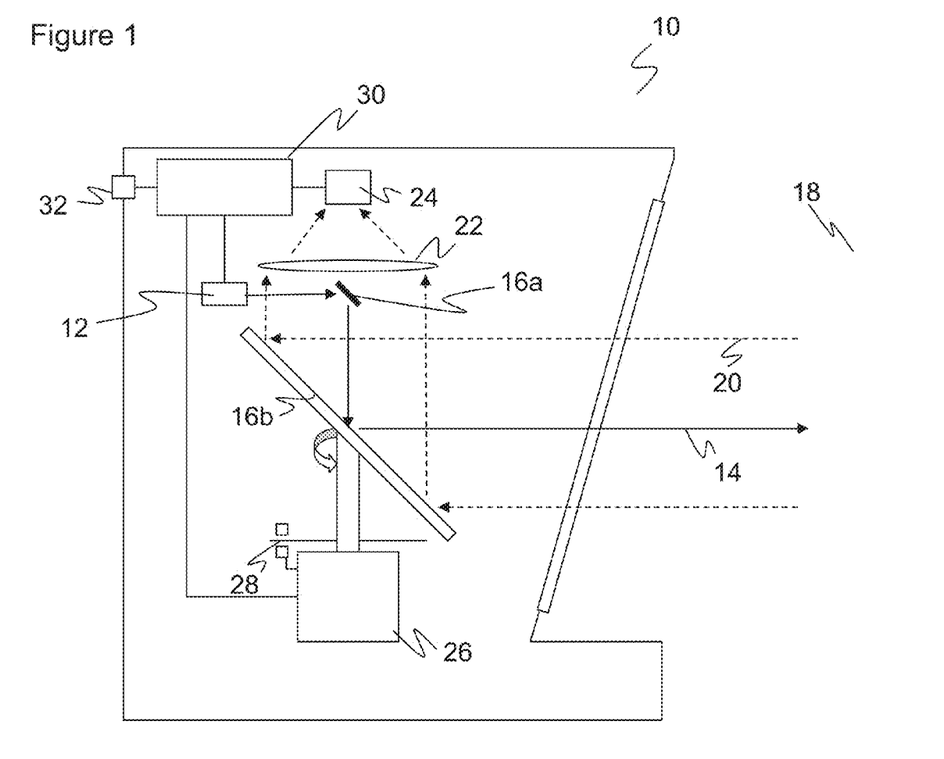
FIG. 1 a schematic sectional view through a laser scanner.

FIG. 1 shows a schematic sectional view through a laser scanner 10. A light beam 14 comprising individual light pulses generated by a light transmitter 12, e.g. a laser, is deflected into a monitoring area 18 by light deflection units 16a-b and, if an object is present, is remitted from there. The remitted light 20 arrives back at the laser scanner 10 and is detected there via the deflection unit 16b and by means of reception optics 22 in a light receiver 24, e.g. a photo diode.

The light deflection unit 16b is generally designed as a rotational mirror which continuously rotates driven by a motor 26. The respective angular position of the light deflection unit 16b is detected by an encoder 28. The light beam 14 generated by the light transmitter 14 thus covers a monitoring area 18 generated by the rotational movement. In case that light a reflected light signal 20 is received from the monitoring area 18, the angular position of the object in the monitoring area 18 can be detected from the angular position of the deflection unit 16b by means of the encoder 28.

Figure 2:
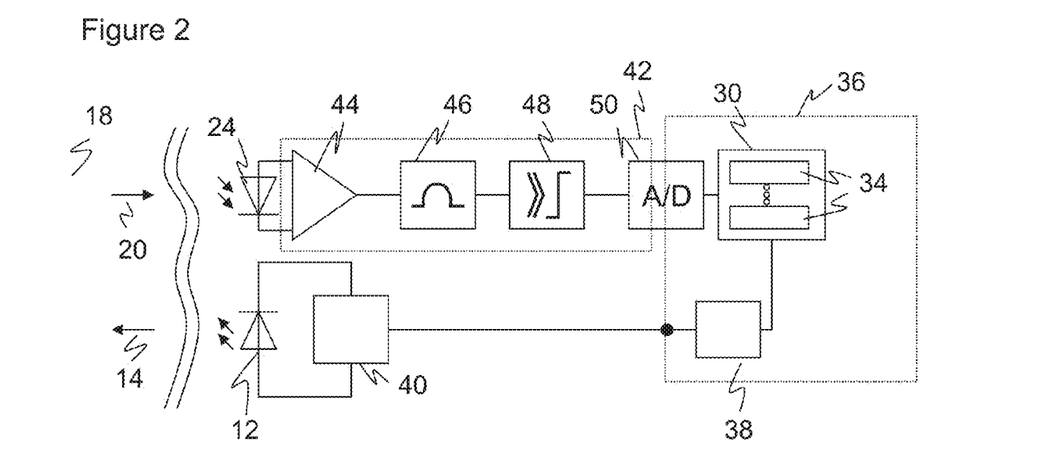
FIG. 2 a block diagram of an analog signal preprocessing and a digital evaluation of the laser scanner of FIG. 1.

In addition, the time of flight of the laser light pulses from their transmission until the reception after reflection from the object in the monitoring area 18 is determined in a multiple pulse method to be explained in more detail with reference to FIGS. 2 and 3 below. From the light time of flight, the distance of the object from the laser scanner 10 is determined using the speed of light. This evaluation is carried out in an evaluation unit 30 which is connected with the light transmitter 12, the light receiver 24, the motor 26 and the encoder 28. Thus, two-dimensional polar coordinates of all objects in the monitoring area 18 are available via the angle and the distance. This data may already be the relevant measurement data which is provided at an output 32.

In safety technology applications, the goal of the evaluation often is detection of protection zone violations. Then, the evaluation unit 30 checks whether an inadmissible object intrudes into protection zones defined within the monitoring area 18. In that case, a shutdown signal is output to a danger source being monitored, for example a machine, via the output 32 here being configured as a safety output (OSSD, Output Signal Switching Device). In these applications in safety technology, the laser scanner 10 preferably is a safe laser scanner due to measures according to the standards mentioned in the introduction or similar standards.

The design of the laser scanner according to FIG. 1 is meant to be exemplary. Other general designs are known and also encompassed by the invention, for example with a polygon mirror wheel or a measurement module rotating as a whole, including light transmitter 12 and light receiver 24, being the deflection unit 16.

The time of flight measurement is done in a multiple pulse method, also called pulse averaging method, which will now be explained with reference to FIGS. 2 and 3. The evaluation unit 30 including a plurality of histogram memories 34 is implemented on a digital device 36, for example an FPGA (Field Programmable Gate Array). In a transmission path, the evaluation unit 30 initiates the transmission of individual light pulses at clearly defined points in time via a delay unit 38 and a laser drive circuit 40. The delay unit may be implemented by registers, counters and the like of the FPGA.

The remitted light 20 of an individual light pulse is converted into a reception pulse by the light receiver 24 and is supplied to the evaluation unit 30 via an analog preprocessor 42 having a preamplifier 44, a filter 46 and a limiting amplifier 48, as well as an A/D converter 50. Preamplifier 44 and filter 46 may also be arranged in reverse order.

Figure 3:
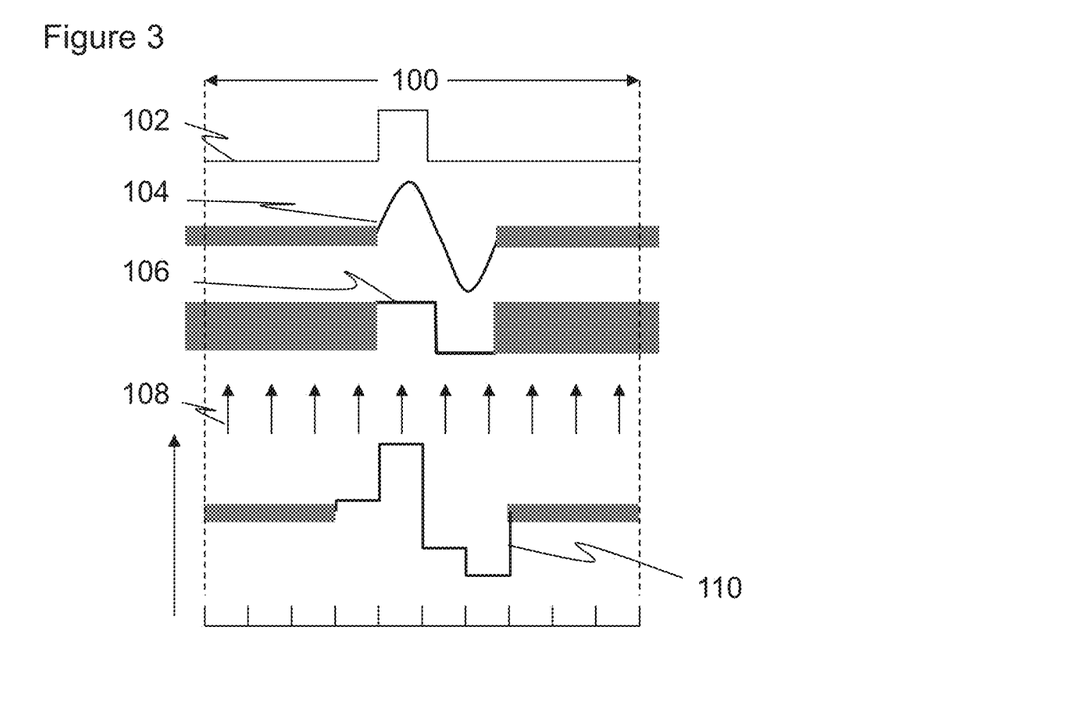
FIG. 3 a representation of the signals in various processing stages of the preprocessing and evaluation of FIG. 2.

The resulting signals in the various intermediate steps are shown in FIG. 3. The light transmitter 12 generates, in each measurement period 100, an individual light pulse enabling precise determination of a point in time. A rectangular pulse is suitable for this purpose, but also other pulses like for example Gaussian pulses. The individual light pulse is reflected or remitted in the monitoring area 18 and subsequently converted into an electrical reception pulse 102 by the light receiver 24, and afterwards is amplified in preamplifier 44 for example being a transimpedance amplifier. The reception pulse 102 is shown in an idealized manner, under realistic conditions noise and shape distortions would be added.

Due to the nature of light, the reception pulse 102 always is a unipolar signal. In the filter 46, for example a band pass filter, it is converted into a bipolar signal 104, of which only the first two oscillations are shown. Beside the actual bipolar signal 104, gray rectangles symbolize a noise level. In the limiting amplifier 48, the bipolar signal 104 is amplified into saturation and cut off, so that the actual signal becomes a rectangular flank 106 and the noise level represented by gray rectangles is stretched in its amplitude over the entire dynamical range.

The rectangular flank 106 is sampled in A/D converter 50 in particular being configured as a binarizer. Each support point of the sampling is symbolized by an arrow 108. The resulting bit sequence is used in the evaluation unit 30 to form a histogram 110. For each bin, an accumulator is provided which is only increased for an associated bit value "1". For ideal signals without noise, in the histogram 110 only bins would be filled where the rectangular flank 106 is positioned. However, the noise level increased by limiting amplifier 48 also fills the other bins, namely, in the expectation value in about each second measurement period 100 due to the randomness of the noise.

In case the method described so far is iterated and the histogram 110 formed over n measurement periods 100, the bins are approximately filled with the value n/2 due to the noise, with added statistical fluctuations. Because of the binarization, this value n/2 corresponds to a signal value zero. From that background, the maximum formed by the positive part of the bipolar signal 104 is raised upwards, and correspondingly the minimum projects downwards. The intermediate zero-crossing is detected by the evaluation unit 30 in order to detect the reception point in time regardless of the signal level. FIG. 3 merely shows a relevant section of the measurement period 100 in a vicinity of the reception point in time. In order to save memory, this time interval can be identified in advance, and the histogram 110 only be formed for a relevant part of the measurement period 100.

During scanning of the monitoring area 18 by the laser scanner 10, individual light pulses are transmitted and the resulting reception pulses are accumulated in a histogram 110 and evaluated by the evaluation unit 30 as just explained. Due to the rotational movement of the deflection unit 16, each individual light pulse has a different angular displacement. This results in degrees of freedom how to assign these individual light pulses in order to form a histogram and thus a measurement value for a certain angular position.

Figure 4A:
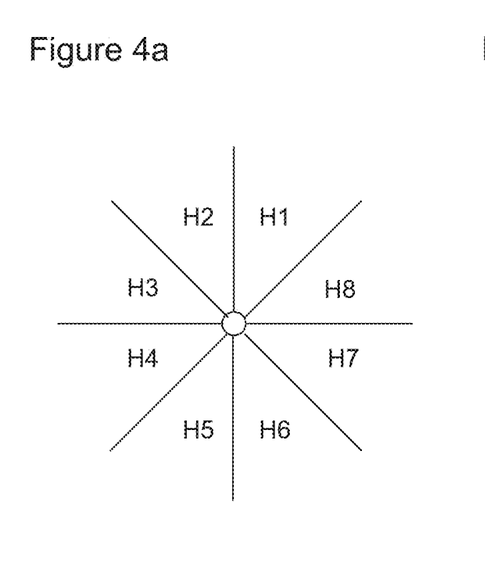
FIG. 4a an illustration of the assignment of angular regions and histogram memories.

This is illustrated in FIG. 4. FIG. 4a shows a classification of the 360° area corresponding to the monitoring area 18 into sectors, a respective histogram H1-H8 being assigned to each sector. The number of sectors is purely exemplary. Typically, a lot more sectors will be formed in practice, for example 360 or 720 sectors for a 1° or 0.5° resolution, since the width of a sector determines the angular resolution. Additionally, the 360° area being scanned by the laser scanner 10 can also be limited, for example to 270° or any other value.

Figure 4B:
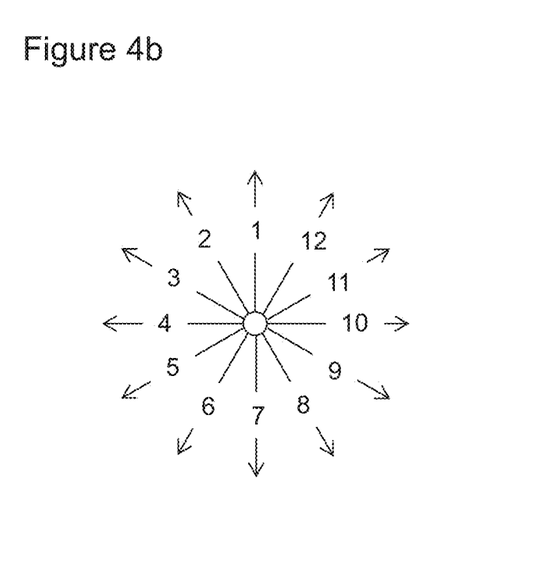
FIG. 4b an illustration of the assignment of angular positions and light pulses.

FIG. 4b shows another classification of the 360° area this time based on individual light pulses of the transmitted light beam 14 and the corresponding reception pulses, respectively. Again, the number shown is purely exemplary and too small for practical embodiments, and realistic embodiments transmit individual light pulses in small steps of 0.25°, 0.5°, 1°, 2° or the like. The number of eight histograms in FIG. 4a on the one hand and twelve light beams 14 in FIG. 4b on the other has intentionally been chosen differently to emphasize that these numbers initially are independent.

Specific embodiments of the assignment of reception pulses to histograms will now be explained with reference to FIGS. 5 to 7. These are non-exhaustive examples, because the implementation of the invention does not depend on the specific assignment, but on the fact that histograms are not accumulated at once, but across several periods of the rotational movement of the deflection unit 16.

Figure 5:
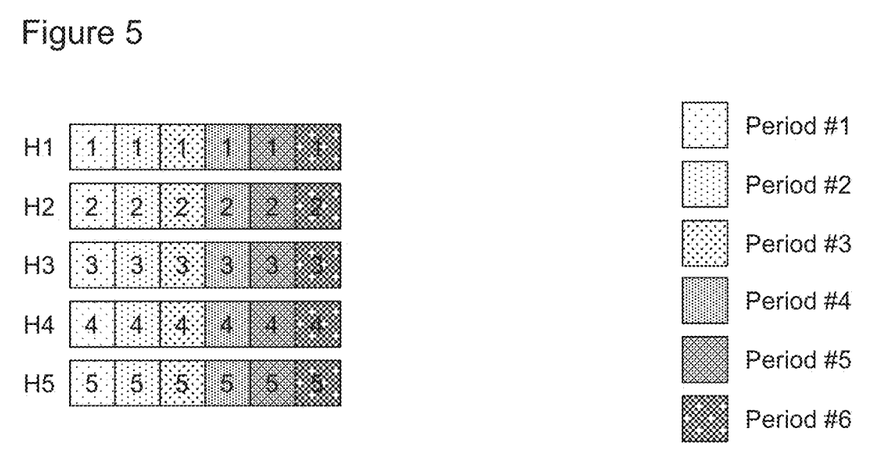
FIG. 5 an illustration of a one-to-one-assignment of light pulses and histogram memories.
Figure 6:
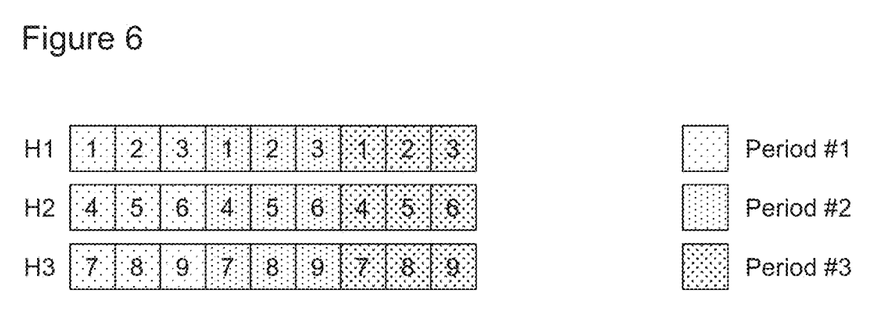
FIG. 6 an illustration of a multiple assignment of light pulses and histogram memories.
Figure 7:
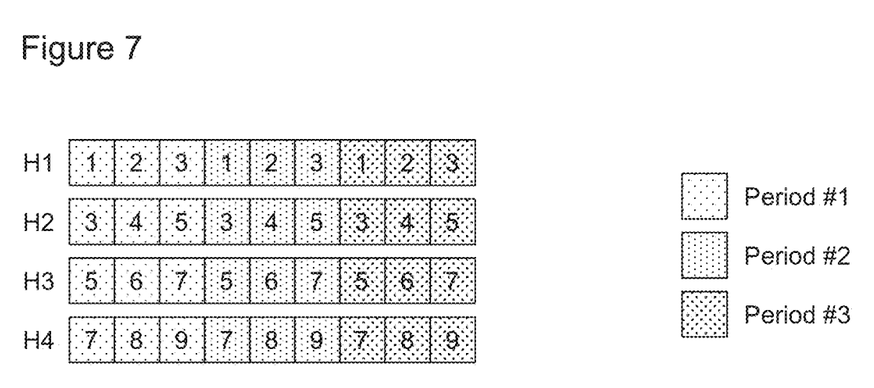
FIG. 7 an illustration of an overlapping multiple assignment of light pulses and histogram memories.

The manner of illustration is the same in FIGS. 5 to 7. Line by line, different histograms H1 to HN are shown, and within a respective line the reception pulses 1-M added to the histogram are shown by a digit written into the respective cell of the histogram. Here, the cells should not be confused with the bins of the histogram: Each reception pulse typically modifies numerous or all bins, the cells of FIGS. 5 to 7, in contrast, merely show the time sequence of added reception pulses. The periods are encoded in gray-scale according to the caption shown on the right. All numbers are purely exemplary to explain the principle, and are probably too small for practical use.

FIG. 5 illustrate a one-to-one assignment, where in each period for each histogram and its assigned sector an individual light pulse is transmitted, and thus exactly one reception pulse per period is added. Therefore, the first histogram H1 obtains the first reception pulse in each period, the second histogram obtains the second reception pulse in each period, and so on. In this embodiment, the desired statistical depth, i.e. the number of reception pulses that should form a histogram to be evaluated, directly determines after how many periods a distance value can be determined. Since each reception pulse is directly and in one-to-one correspondence assigned to a histogram in a fixed angular position, the histogram averages only over time, i.e. the periods that have passed, but not over position or angle, respectively.

FIG. 6 illustrates an alternative assignment, where in the same period several successive reception pulses are added to the same respective histogram. In this example, the first histogram H1 obtains the first three reception pulses of each period, the second histogram H2 obtains the fourth to sixth reception pulse, and so on. In this manner, histograms will be filled more quickly, but at the same time the angular resolution decreases as compared to the angular steps of the sampling, and there is an averaging over the sector of the respective histogram. These effects can be weight against one another by selection of the number of successive reception pulses accumulated in a histogram, which number is three in the example of FIG. 6.

FIG. 7 illustrates a variation of the embodiment according to FIG. 6. Again, several successive reception pulses are added to the same histogram during the same period. However, in contrast to FIG. 6, one and the same reception pulse is considered in the histograms of several adjacent sectors in an overlapping manner. In this example, the first histogram H1 obtains the first three reception pulses in each period, the second histogram H2 obtains the third to fifth reception pulse, and so on. Some reception pulses, in this example the odd-numbered reception pulses, contribute to two histograms, while other reception pulses, in this example the even-numbered reception pulses, are exclusively assigned to one histogram. Both the degree of overlap and the number of successive reception pulses to be considered in a histogram can be chosen differently than in FIG. 7. It is also conceivable that one reception pulse contributes to more than two histograms. FIG. 6 may be understood as a special case with zero degree of overlap. The overlapping forming of histograms leads to faster filling of histograms without affecting angular resolution. On the other hand, there is some redundancy in the statistical basis, i.e. the measurement values are not independent among another, but nevertheless represent their respective sector with actual measurement data.

In FIGS. 5 to 7, the histograms are always completely rebuilt. It is alternatively possible to remember in a rolling manner from what period a reception pulse originated, and to replace the oldest reception pulse in the histogram with the current reception pulse in the manner of a FIFO memory. A similar idea is to let the values in the bins of the histogram fade, for example in an exponential decay, and to add the respective current reception pulse. These are two possibilities to provide up-to-date histograms in each period although their data base has been intermittently accumulated across several periods.

Since the histograms are anyway accumulated across several periods, it is not necessary that the evaluation unit 30 is fast enough to evaluate all histograms in one period. Instead, a staggered evaluation is conceivable, where groups are formed and only histograms of one group are evaluated per period. It is possible to also fill the histograms in a group-wise staggered manner, so that they are available in that period where the group is evaluated. A staggered forming of histograms is of course not necessary in embodiments where the histograms are always up-to-date. However, a staggered evaluation is still possible in those embodiments.

Histograms are accumulated across several periods over a longer time interval in particular to filter view impairments, like rain drops or snow flakes. It is thus ensured that at most a part of the measurements for one histogram are affected even in heavy rain. Individual signals of rain drops then only have minor influence, which can be compensated by the multiple pulse method.

New, independent measurement values are no longer available in each period. This effect is particularly pronounced in an embodiment with one-to-one assignment of reception pulses and histograms according to FIG. 5. One possibility to improve the response time is moderate to strong increase of revolution speed of deflection unit 16 up to at least 10,000 revolutions per minute. For example, at 20,000 revolutions per minute, a histogram accumulated across 30 periods is available after 90 ms. Given the same boundary conditions, by accumulating reception pulses across several periods, fewer individual light pulses are transmitted than in a conventional averaging over several successive reception pulses of the same period. As a result, significantly higher laser power can be used, and thus the signal-to-noise ratio further be improved. This gain with respect to analog noise also compensates a loss in lower statistical depth to some extent, so that the number of periods for accumulating a histogram may be selected lower than the number of successive reception pulses in a conventional pulse averaging method.

Since high revolution speed requires a corresponding opto-mechanical complexity, alternatively a moderate revolution speed of for example 5,000 revolutions per minute can also be used. Then, preferably several reception pulses are added to the histograms per periods as in the embodiments of FIGS. 6 and 7. For example, if seven reception pulses (3 bit) are added to the histograms per period, a histogram of statistical depth 49 is already formed after only seven periods, so that even with a lower revolution speed a response time below for example 90 ms is possible with measurement results of comparable quality.

Depending on the implementation, the reception pulses are directly accumulated in the histograms, or are buffered, for example to remove the oldest reception pulses from the histograms on a rolling basis as in a FIFO memory. An estimate for the memory requirements at viewing angle of 275° and angular steps of the transmitted individual light pulses of $\frac{1}{8}$° is 2,200 measurement points per period. For a histogram width of 1,024 bins, each reception pulse requires 1,024 bits if the amplitude is coded with 1 bit as explained with reference to FIGS. 2 and 3.

In the first example of a one-to-one correspondence explained above over 30 periods, a memory requirement of 30 periods×1 bit/bin×2,200 measurement points/period×1,024 bins/measurement points=64.5 Mbit results. In the second example, where seven reception pulses per period contribute to a histogram, it would accordingly be 7 periods×3 Bit/Bin× 2,200 measurement points/period×1,024 bins/measurement point=45.1 Mbit.

The histograms may alternatively also directly be accumulated with the incoming reception pulses in order to reduce the memory requirements. To that end, reception pulses are immediately added to the histogram. After the required number of periods, a light time of flight is determined, and all bins are reset. It is alternatively possible to not reset the bins, but let them periodically fade. Then, an up-to-date histogram is always available that forgets its past, for example exponentially.

The invention claimed is:

1. An optoelectronic sensor (10) for the detection and distance determination of objects in a monitoring area (18), the sensor (10) comprising:

a light transmitter (12) for transmitting a transmission light beam (14) having a plurality of consecutive individual light pulses;

a rotatable deflection unit (16) for a periodic deflection of the transmission light beam (14) in the monitoring area (18);

an angle measuring unit (28) for determining an angular position of the deflection unit (16);

a light receiver (24) for generating reception pulses from transmission light remitted or reflected by objects in the monitoring area (18);

at least one histogram memory (34); and an evaluation unit (30) which is configured to accumulate a time histogram from a plurality of reception pulses in the histogram memory (34) and to determine, from the histogram, a light time of flight from the sensor (10) to an object and therefrom an object distance, wherein a plurality of histogram memories (34) is provided, each associated with an angular position, and the evaluation unit (30) is configured to intermittently accumulate time histograms in the histogram memories (34) across several rotations of the deflection unit (16) from reception pulses which are each detected at the same angular position associated with the respective histogram memory (34), and to determine the object distance for an angular position from the histogram of the associated histogram memory (34).

2. The sensor (10) according to claim 1, wherein the optoelectronic sensor is a laser scanner.

3. The sensor (10) according to claim 1, wherein the evaluation unit (30) is configured to add one and only one reception pulse to the histograms per period of the rotational movement of the deflection unit (16).

4. The sensor (10) according to claim 1, wherein the evaluation unit (30) is configured to add several consecutive reception pulses to the histograms per period of the rotational movement of the deflection unit (16).

5. The sensor (10) according to claim 1, wherein the evaluation unit (30) is configured to add a reception pulse to several histograms in histogram memories (34) associated with adjacent angular positions.

6. The sensor (10) according to claim 1, wherein the evaluation unit (30) is configured to divide the histogram memories (34) into a plurality of groups and to evaluate the histograms accumulated in the histogram memories (34) in a staggered manner over a corresponding number of periods of the rotational movement of the deflection unit (16) by determining the light time of flight from histograms of histogram memories (34) of one group in one period.

7. The sensor (10) according to claim 1, wherein the deflection unit (16) has a rotational speed of at least 10,000 revolutions per minute.

8. The sensor (10) according to claim 1, wherein the histogram memories (34) are FIFO memories so that when the most recent reception pulse is added the oldest reception pulse is deleted.

9. The sensor (10) according to claim 1, wherein the evaluation unit (30) is configured to periodically let values in the histogram memories (34) fade and to increase the values for a new reception pulse to be added.

10. The sensor (10) according to claim 1, wherein the evaluation unit (30) is configured to determine a light time of flight from the histograms with an evaluation period shorter than the period required to accumulate a complete histogram.

11. The sensor according to claim 1, wherein the evaluation unit (30) is configured to determine a light time of flight form the histogram once per period of the rotational movement of the deflection unit (16).

12. The sensor (10) according to claim 1, wherein the reception pulses are accumulated in the histograms following a binarization.

13. The sensor (10) according to claim 1, wherein the evaluation unit (30) is configured to compare the object distances determined in dependence on angular positions with predefined protection zones in order to detect an object intrusion into a protection zone and to then output a safety-related shutdown signal.

14. A method for the detection and distance determination of objects in a monitoring area (18), wherein
a transmission light beam (14) having a plurality of consecutive individual light pulses is transmitted and periodically scans the monitoring area (18) by means of a rotatable deflection unit (16) whose respective angular position is measured, reception pulses are generated from transmission light remitted or reflected by objects in the monitoring area (18), a time histogram is intermittently accumulated from a plurality of reception pulses in at least one histogram memory (34), and a light time of flight to an object and therefrom an object distance is determined, wherein time histograms are intermittently accumulated in a plurality of histogram memories (34) each associated with an angular position, time histograms are intermittently accumulated in the histogram memories (34) across several rotations of the deflection unit (16) from reception pulses which are each detected at the angular position associated with the respective histogram memory (34), and the object distance for an angular position is determined from the histogram of the associated histogram memory (34).

15. The method of claim 14, wherein several consecutive reception pulses are added to a histogram.

16. The method of claim 14, wherein the histograms are accumulated and evaluated in a moving window.

17. The method of claim 14, wherein the object distances determined in dependence on angular positions are compared with predefined protection zones in order to detect an object intrusion into a protection zone and in that case a safety-related shutdown signal is output.

* * * * *